Patented Oct. 15, 1935

2,017,217

UNITED STATES PATENT OFFICE 2,017,217

PROCESS OF MANUFACTURING SPONGE RUBBER

Henry R. Minor, Oak Park, Ill., assignor, by mesne assignments, to Industrial Process Corporation, Saratoga Springs, N. Y., a corporation of New York No Drawing. Application November 28, 1932, Serial No. 644,687

11 Claims. (Cl. 18—53)

The present invention relates to the manufacture of sponge rubber, it being the object of the invention to simplify and cheapen the cost of manufacture, to obtain more uniform products, and even and regular distribution of the cells or pockets in the rubber. In addition to these beneficial results the sponge rubber made by the process herein disclosed will have superior aging qualities, and the tensile strength will be greatly increased over sponge rubber produced by known methods.

The usual and ordinary practice of making sponge rubber is to incorporate within the rubber certain blowing ingredients, such as sodium or ammonium carbonate, which will react when heated during vulcanization, aided by the weak organic acids present, to form gases which gives the cellular construction to the cured rubber. It is recognized that this old process has certain disadvantages due to the fact that the rubber must be milled excessively in the compounding, which breaks down and weakens the rubber so that its tensile strength is greatly impaired. The cellular structure obtained is not uniform and the cells must be broken down immediately after curing in order to prevent disastrous shrinkage.

By the process described herein the product is greatly improved in tensile and aging qualities, and the process is simplified and rendered more efficient and more economical.

The basis of the present invention lies in the utilization of certain properties of oily softening agents which have a great affinity for carbon dioxide gas, or other inert gases, at low temperatures, and at atmospheric pressure, but which will give off the gas at the temperature of vulcanization. These agents are used as vehicles for introducing the inert gas in the rubber.

As an efficient working example of such a vehicle, the present inventor has employed triethanolamine, which is an oil having definite and well recognized properties as a softening agent for rubber. To this substance water is added, 25% to 50% by volume being satisfactory, and then it is subjected to carbon dioxide gas. At atmospheric pressure this combination will absorb as high as ninety times its volume of the gas. Triethanolamine treated as above described is added to the rubber on the mill into which it works and distributes easily, and aids in the successful milling operation. The quantity used is determined by the results desired. Due to the unusual capacity of this material for carbon dioxide gas small quantities only need be employed to secure satisfactory results in cellular formations. The rubber is milled at a temperature low enough so that the carbon dioxide gas is retained by the vehicle. The rubber is compounded with any of the usual or well known fillers, sulphur and accelerator.

When the batch is properly milled the oil will be distributed evenly throughout the mass, and as the vulcanization proceeds the carbon dioxide gas will be liberated within the mass forming the cellular structure desired. This oil will give off the gas continuously and at substantially even and uniform rate during the early part of the vulcanization of the rubber, so that the product is noteworthy for the regularity and uniformity of the cells, and their regular and even distribution.

Other vehicles of a nature similar to triethanolamine may be employed, and other inert gases may be substituted for the carbon dioxide gas. Actual use of the process has disclosed the fact that the combination of triethanolamine and carbon dioxide reacts favorably, and secures superior results in operation and product. The rubber sponge has superior aging qualities over the usual sponge rubber due probably to the fact that the period of milling is reduced, and to the presence of carbon dioxide in the cells, which is in itself an admirable age resister.

The softener or carrier for the carbon dioxide gas not only serves to supply the gas for cell making, but eliminates the use of other rubber softeners to which it is superior. It also imparts definite technical advantages to the finished product. Stocks treated and prepared in the manner described may stand for days prior to use without deterioration, an advantage not found in the ordinary sponge rubber stocks which must be used almost immediately after batching.

It is probable that the carbon dioxide gas is retained within the triethanolamine by some sort of chemical reaction which reaction reverts on the application of the proper heat so as to release the gas.

While the particular combination has been set forth, it will be apparent that substitutes may be employed within the scope of the invention, and having disclosed the basic features of the invention, modifications and changes may be conceived by those skilled in the art which embody the invention, although differing in detail from the specific disclosure set forth.

What is claimed is:

1. The process of manufacturing sponge rubber, comprising adding to the rubber compound a quantity of triethanolamine which has been subjected to and into which has been absorbed a volume of carbon dioxide gas, milling at a low temperature so that the gas is retained by the triethanolamine, and then vulcanizing the rubber so compounded, the heat employed in vulcanization releasing the gas.

2. The process of manufacturing sponge rubber, comprising vulcanizing a rubber compound having a quantity of triethanolamine incorporated therein which holds the carbon dioxide gas and releases the gas as the vulcanization proceeds.

3. The process of manufacturing sponge rubber, comprising subjecting triethanolamine to the action of carbon dioxide gas for a sufficient period so that it will absorb many times its volume of the gas, incorporating the triethanolamine so treated in a rubber compound at low temperature, and vulcanizing the rubber whereby the gas is released throughout the mass to form cells therein.

4. The process of manufacturing sponge rubber, comprising subjecting triethanolamine to the action of an inert gas for a sufficient period so that it will absorb many times its volume of the gas, incorporating the triethanolamine so treated in a rubber compound at low temperature, and vulcanizing the rubber whereby the gas is released throughout the mass to form cells therein.

5. In a process of making sponge rubber, the step of milling rubber containing an ethanolamine compound having an inert gas loosely bound thereto which is subsequently released therefrom during vulcanization.

6. In a process of making sponge rubber, the step of milling rubber containing triethanolamine having carbon dioxide gas loosely bound thereto which is subsequently released therefrom during vulcanization.

7. In a process of making sponge rubber, the step of vulcanizing a milled rubber containing an ethanolamine having an inert gas loosely bound thereto which is released therefrom during vulcanization.

8. In a process of making sponge rubber, the step of vulcanizing a milled rubber containing an ethanolamine having carbon dioxide gas loosely bound thereto which is released therefrom during vulcanization.

9. A rubber compound containing an ethanolamine having an inert gas loosely bound thereto which will be released therefrom during vulcanization.

10. A rubber compound containing triethanolamine having an inert gas loosely bound thereto which will be released therefrom during vulcanization.

11. A rubber compound containing triethanolamine having carbon dioxide gas loosely bound thereto which will be released therefrom during vulcanization.

HENRY R. MINOR.